(12) United States Patent
Adis

(10) Patent No.: US 7,704,041 B2
(45) Date of Patent: *Apr. 27, 2010

(54) VARIABLE CLEARANCE POSITIVE PRESSURE PACKING RING AND CARRIER ARRANGEMENT WITH COIL TYPE SPRING

(75) Inventor: William Edward Adis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/399,720

(22) Filed: Apr. 7, 2006

(65) Prior Publication Data

US 2007/0237628 A1    Oct. 11, 2007

(51) Int. Cl.
*F01D 11/02* (2006.01)
*F16J 15/447* (2006.01)
(52) U.S. Cl. .................... 415/174.5; 277/413; 277/416; 277/418; 277/421
(58) Field of Classification Search ................ 277/412, 277/413, 418, 419; 415/1, 173.5, 174.5
See application file for complete search history.

(56) References Cited

U.S. PATENT DOCUMENTS

| 3,529,906 | A | * | 9/1970 | Borden et al. ................ 415/180 |
| 5,362,072 | A | * | 11/1994 | Dalton ........................ 277/413 |
| 5,374,068 | A | * | 12/1994 | Jewett et al. ................. 277/303 |
| 5,709,388 | A | * | 1/1998 | Skinner et al. ............... 277/412 |
| 6,572,115 | B1 | * | 6/2003 | Sarshar et al. ............... 277/412 |
| 6,655,696 | B1 | * | 12/2003 | Fang et al. ................... 277/409 |
| 6,840,519 | B2 | * | 1/2005 | Dinc et al. ................... 277/413 |
| 7,229,246 | B2 | * | 6/2007 | Ghasripoor et al. ....... 415/173.3 |
| 7,641,200 | B2 | * | 1/2010 | Chevrette .................... 277/303 |

* cited by examiner

*Primary Examiner*—Edward Look
*Assistant Examiner*—Nathaniel Wiehe
(74) *Attorney, Agent, or Firm*—Cantor Colburn LLP (57) ABSTRACT

A packing ring assembly is provided and includes an arcuate carrier ring segment, an arcuate packing ring segment movable relative to the carrier ring segment, an attachment component disposed in association with the packing ring segment and in association with the carrier ring segment, and an actuator component configured to maintain the packing ring segment in a first position and to allow a movement of the packing ring segment to a second position when the packing ring assembly is exposed to a pressure condition.

19 Claims, 8 Drawing Sheets

VARIABLE CLEARANCE POSITIVE PRESSURE PACKING RING AND CARRIER ARRANGEMENT WITH COIL TYPE SPRING

FIELD OF THE INVENTION

This disclosure relates generally to packing rings used in rotary machines, and more particularly to variable clearance, positive pressure packing rings for use industrial steam turbines.

BACKGROUND OF THE INVENTION

In rotary machines such as turbines, seals are provided between rotating and stationary components. For example, in steam turbines it is customary to provide a plurality of arcuate packing ring segments to form an annular labyrinth seal between the stationary and rotating components. Typically, the arcuate packing ring segments (typically, four to six per annular seal) are disposed in an annular groove in the stationary component concentric to the axis of rotation of the machine and hence concentric to the sealing surface of the rotating component. Each arcuate seal segment carries an arcuate seal face in opposition to the sealing surface of the rotating component. In labyrinth type seals, the seal faces carry a radially directed array of axially spaced teeth, and which teeth are radially spaced from an array of axially spaced annular teeth forming the sealing surface of the rotating component. The sealing function is achieved by creating turbulent flow of a working media, for example, steam, as it passes through the relatively tight clearances within the labyrinth defined by the seal face teeth and the opposing surface of the rotating component.

The ability to maintain proper clearances without physical contact between the rotating equipment and stationary components allows for the formation of an effective seal. If this radial clearance between the seal faces of the segments and the opposing seal surfaces of the rotating component becomes too large, less turbulence is produced and the sealing action is compromised. Conversely, if the clearance is too tight, the sealing teeth may contact the rotating element, with the result that the teeth lose their sharp profile and tight clearance and thereafter create less turbulence, likewise compromising the sealing action.

In order to create and maintain a desired seal and to avoid damage to the rotor and packing ring during transient conditions, positive pressure, variable clearance packing rings may be used as further disclosed, and hereby incorporated by reference, in: GE Docket No. 193439, Cantor Colburn LLP Docket No. GS1-0202, entitled "Variable Clearance Packing Ring Arrangement"; GE Docket No. 194777, Cantor Colburn LLP Docket No. GS1-0210, entitled "Apparatus and Method for Steam Turbine Variable Clearance Packing"; and GE Docket No. 193442, Cantor Colburn LLP Docket No. GS1-0203, entitled "Variable Clearance Positive Pressure Packing Ring and Carrier Arrangement"; (U.S. Ser. Nos. not yet available). In these type of positive pressure, variable clearance packing rings, the packing ring segments are typically spring biased into outer or large clearance positions causing the seal faces carried by the packing ring to be spaced substantially outwardly of the rotary component. After start-up, the working fluid medium, e.g., steam, is inlet to the stationary component, creating a pressure differential which urges the segments to move inwardly against the bias of the springs, toward the inner or small clearance positions. These springs and corresponding ring components are typically located within the annular groove defined by the stationary housing.

However, installation of positive pressure, variable clearance packing rings in existing steam turbines can be a complicated matter which requires field machining or other modification of the rings or of the casing used to mount the rings within the annular groove of the stationary housing. Also, due to circumferential movement of the independent arch segments, retrofitted variable clearance packing rings are prone to archbinding, a condition where an arch segment rides circumferentially over an adjacent segment, jamming the segments in a radially offset position.

Thus, there is a need for a variable clearance positive pressure packing ring which may be easily and simply installed in an annular groove of a stationary component of an existing steam turbine in such manner as to avoid undesired archbinding conditions as well as excessive or complicated machining.

BRIEF SUMMARY OF THE INVENTION

Disclosed herein is a packing ring assembly including an arcuate carrier ring segment, an arcuate packing ring segment movable relative to the carrier ring segment, an attachment component disposed in association with the packing ring segment and in association with the carrier ring segment, and an actuator component configured to maintain the packing ring segment in a first position and to allow a movement of the packing ring segment to a second position when the packing ring assembly is exposed to a pressure condition.

Also disclosed herein is a steam turbine, including a stationary turbine diaphragm; a rotary turbine shaft disposed within the turbine diaphragm, the turbine diaphragm including an annular groove extending around the turbine shaft, and a packing ring assembly having a carrier ring disposed within the annular groove, a plurality of variable clearance arcuate packing ring segments disposed around the turbine shaft in a radially moveable association relative to the carrier ring, and a retention arrangement configured to maintain circumferential positions of the plurality of packing ring segments.

Further disclosed herein is a method of sealing a rotary machine with a positive pressure variable clearance packing ring assembly, the method including configuring a carrier ring to be received and retained in an annular groove of a stationary diaphragm of the rotary machine, disposing the carrier ring within the annular groove and around a rotary shaft of the rotary machine, connecting a plurality of packing ring segments to the carrier ring in a radially moveable association relative to the carrier ring; and maintaining circumferential positions of the plurality of packing ring segments during radially movement of the plurality of packing ring segments.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
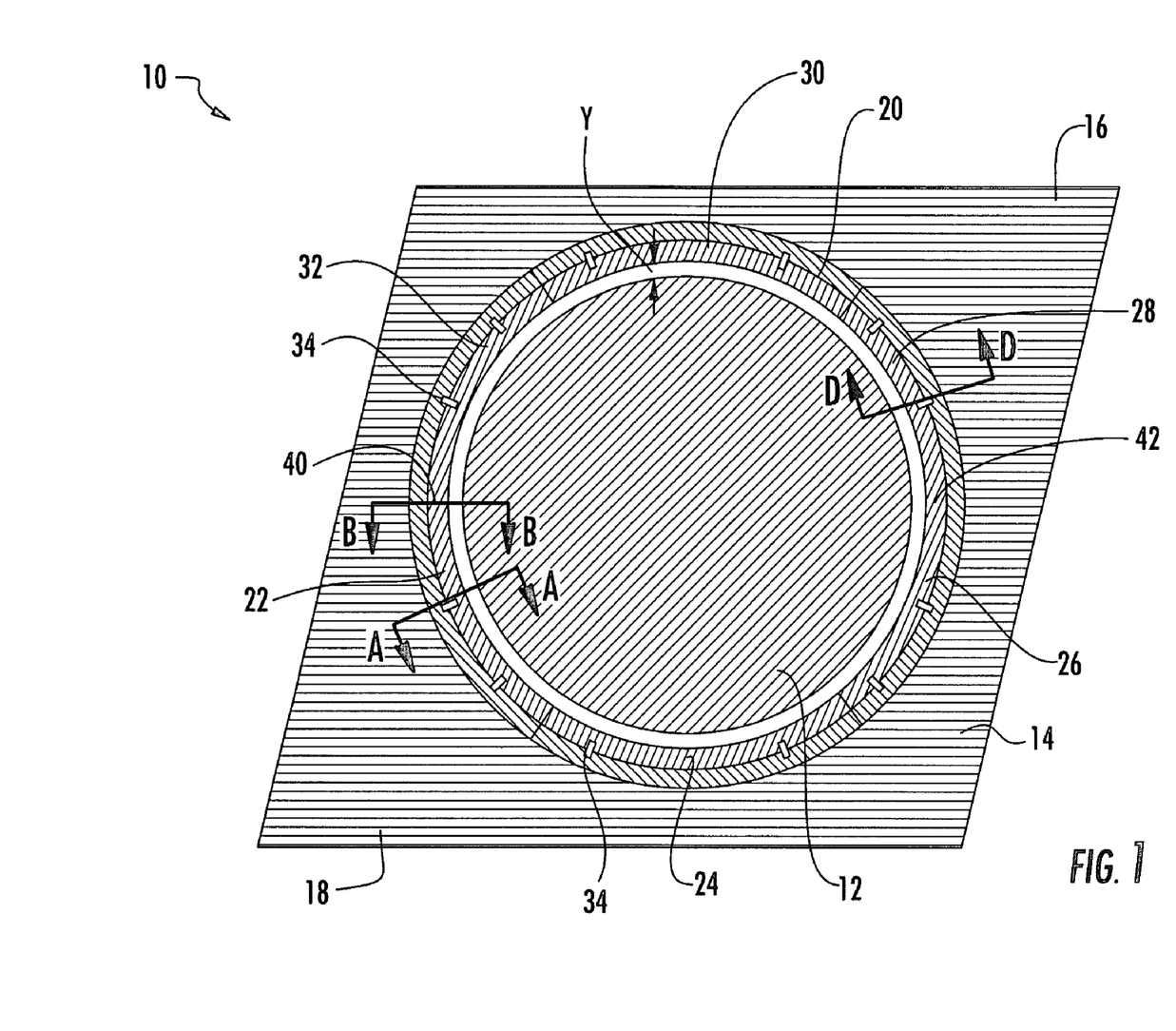
FIG. 1 is a section view of a portion of a steam turbine for use in accordance with an embodiment of the invention.

Referring to FIG. 1, a portion of a steam turbine 10 includes a turbine shaft 12 disposed in a stationary turbine diaphragm 14. The turbine diaphragm 14 comprises opposing first and second diaphragm halves 16 and 18, respectively. A labyrinth seal is provided at the turbine shaft-to-diaphragm interface to prevent leakage. The labyrinth seal is formed by the interaction of a positive pressure, variable clearance packing ring assembly 20 and an outer surface of the turbine shaft 12.

The packing ring assembly 20 is disposed in the turbine diaphragm 14 and is arranged circumferentially about the turbine shaft 12. The packing ring assembly 20 is shown illustratively in FIG. 1 comprising an annular packing ring 21 composed of six arcuate segments including first, second, and third packing ring segments 22, 24, and 26, respectively, disposed on the lower second diaphragm half 18, and fourth, fifth, and sixth packing ring segments 28, 30, and 32, respectively, disposed on the upper first half 16 of the turbine diaphragm 14. The six packing ring segments 22, 24, 26, 28, 30, 32 are described herein by way of example only. Any plurality of ring segments may be used. For example, the packing ring assembly 20 may include a total of four arcuate ring segments, two disposed at the first half 16 of the turbine diaphragm and two disposed at the second half 18.

The various packing ring segments 22, 24, 26, 28, 30, and 32 are disposed in association with a carrier ring 36, as discussed in greater detail below. An actuator component 34, such as a coil spring, is disposed between the packing ring segments 22, 24, 26, 28, 30, 32 and the carrier ring 36 to thus allow movement of the former relative to the latter. The carrier ring 36 is disposed in an annular groove 38 of the turbine diaphragm 14 and is comprised, preferably, of a plurality of arcuate carrier ring segments. The carrier ring 36 may include, for example, six carrier ring segments which generally correspond in size and disposition to the various packing ring segments 22, 24, 26, 28, 30, and 32. Alternatively, one carrier ring segment may be of sufficient size and length so as to correspond to a multiple of packing ring segments, for example, one carrier ring segment may correspond to two packing ring segments.

It will be appreciated that in the assembly of FIG. 1, and the remaining figures, the packing ring segments 22, 24, 26, 28, 30, and 32 comprise positive pressure, variable clearance packing ring segments movable between an open outermost large clearance position and a closed innermost small clearance position about the turbine shaft 12 at startup and at speed operations, respectively. The packing ring segments 22, 24, 26, 28, 30, and 32 are biased to their open, outermost largest diameter position by the actuator component 34 disposed in association with the carrier ring 36. To displace the packing ring segments 22, 24, 26, 28, 30, and 32 into their closed smaller diameter position, a flowing medium, for example, steam, is permitted to move along an outer face of the packing ring segments and/or in spaces delimited between the packing ring segments 22, 24, 26, 28, 30, and 32, the turbine diaphragm 14, the actuator component 34, and the carrier ring 36 whereby a pressure differential is created which displaces the packing ring segments radially inward toward the turbine shaft 12 against the bias of the actuator component 34. Optionally, the turbine diaphragm 14 and/or the packing ring segments 22, 24, 26, 28, 30, and 32 may include a plurality of passages (not shown) to facilitate introduction and movement of the flowing medium.

The packing ring assembly 20 delimits horizontal joints 40 and 42 at opposites sides of the turbine diaphragm 14 where the upper first half 16 of the turbine diaphragm 14 meets the lower second half 18. More particularly, the horizontal joints 40, 42 are formed at the intersection of the first and sixth packing ring segments 22 and 32, respectively, and at the intersection of the third and forth packing ring segments 26 and 28, respectively. As discussed further below, the packing ring segments 22, 32 and 26, 36 (and their corresponding carrier ring segments) terminate respectively at the horizontal joints 40 and 42.

Figure 2:
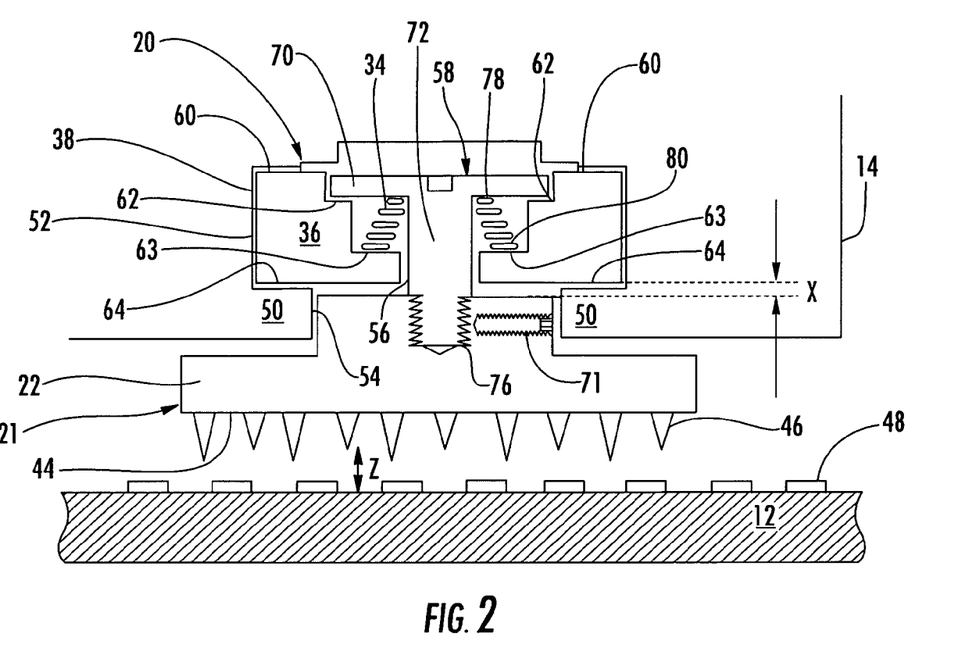
FIG. 2 is an enlarged section view of the exemplary steam turbine of FIG. 1 taken along axis A-A.

FIG. 2 shows a cross-sectional view of a portion of the steam turbine 10 taken along axis A-A of FIG. 1. Particularly, FIG. 2 shows the packing ring segment 22 at the actuator component 34. This view of the packing ring segment 22 is now discussed in detail as being representative of the remaining packing ring segments 24, 26, 28, 30, and 32 which are substantially similar to the segment 22 and thus which are not each discussed in detail herein.

As shown in FIG. 2, the packing ring segment 22 includes a sealing face 44 having teeth 46 arranged thereon so as to be opposite from protuberances 48 disposed on the turbine shaft 12. The remaining packing ring segments 22, 24, 26, 28, and 30 also include the sealing face 44 and the teeth 46 such that the packing ring 21 delimits a continuous sealing surface circumferentially around the turbine shaft 12. Likewise, the protuberances 48 extend around the circumference of the shaft 12. The teeth 46 and the protuberances 48 serve to form the labyrinth seal during operation of the steam turbine 10.

As introduced above, the packing ring assembly 20 comprises the carrier ring 36, the actuator component 34, and the annular packing ring 21 formed of the arcuate segments 22, 24, 26, 28, 30, 32. As shown in FIG. 2, the carrier ring 36 is disposed within the annular groove 38 defined by the stationary turbine diaphragm 14. The diaphragm 14 includes flanges 50 which give the annular groove 38 a generally dovetail shaped cross-section, as shown in the drawing. As such, the annular groove 38 comprises a first portion 52 and a second portion 54, where the first portion 52 is disposed at a radially outer position relative to the second portion 54, and where the second portion 54 is essentially a neck portion having a narrower cross-sectional width as compared to that of the first portion 52.

The carrier ring 36 is configured to seat within the first portion 52 of the annular groove 38. That is, the segments of the carrier ring 36 are shaped and sized in correspondence with the configuration of the first portion 52 of the annular groove 38 such that the carrier ring 36 is held therein. Particularly, the carrier ring 36 is seated on and/or bears against the flanges 50 of the turbine diaphragm 14. The carrier ring 38 may be snap-fit into the first portion 52 of the annular groove 38 and be held therein in a snug friction fit. Alternatively and/or additionally, the carrier ring 38 may be fixed at the interior of the annular groove 38 to the turbine diaphragm 14 by any suitable means such as, for example, mounting screws, set screws, etc. Preferably, however, the carrier ring 36 is disposed in a floating arrangement relative to the annular groove 38. That is, a desired clearance is provided about the carrier ring 36 within the first portion 52 of the groove 52 such that the carrier ring 36 is permitted a slight degree of movement there within.

Figure 3:
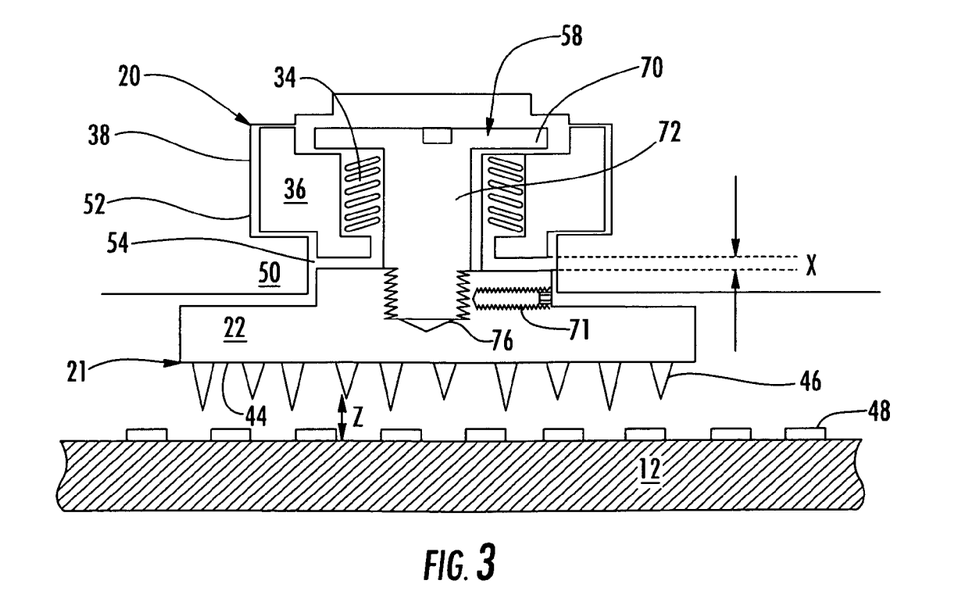
FIG. 3 is an enlarged section view of another embodiment of the exemplary steam turbine of FIG. 1 taken along axis A-A.
Figure 4:
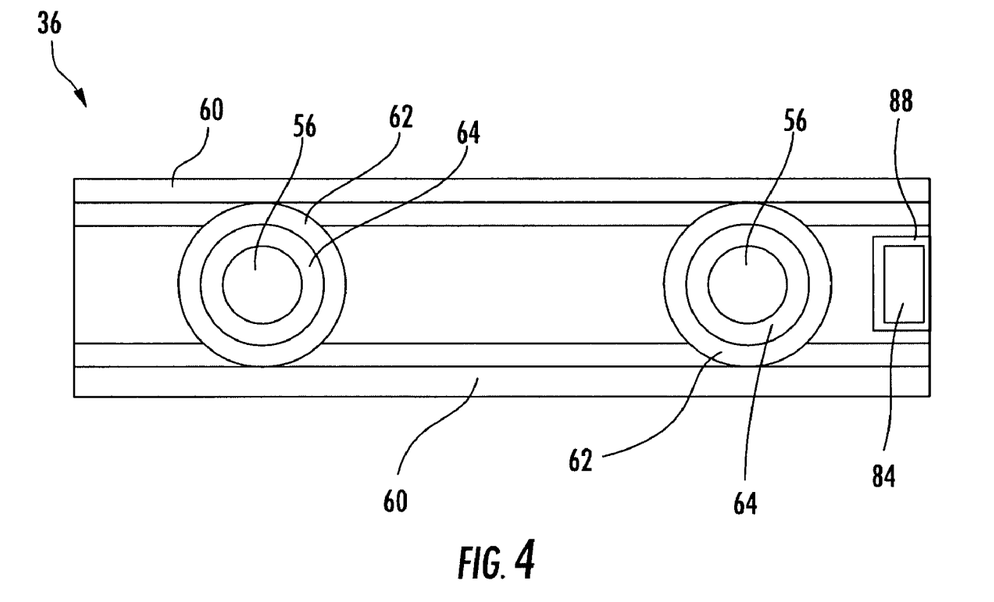
FIG. 4 is plan view of a carrier ring segment.

Referring now to FIGS. 2-4, the carrier ring 36 is comprised of a plurality of identical arcuate track-like segments each having a plurality of apertures 56 formed therethrough which allow passage of an attachment component 58, as described in more detail herein. Each segment of the carrier ring 36 further includes a plurality of bearing surfaces formed thereon. A first bearing surface 60 is disposed on the carrier ring 36 so as to engage the turbine diaphragm 14 at a location generally opposite from the flange 50 of the diaphragm 14. The carrier ring 36 includes a second bearing surface 62 disposed in association with the attachment component 58. A third bearing surface 63 is disposed in association with the actuator component 34. The carrier ring 36 includes a fourth bearing surface 64 arranged in association with the flange 50 of the turbine diaphragm 14. The first and fourth bearing surfaces 60 and 64, respectively, of the carrier ring 36 bear against the annular groove 38 of the turbine diaphragm and serve to retain the carrier 36 therein. The fourth bearing surface 64 additionally serves to engage and impede outward radial movement of the packing ring segments 22, 24, 26, 28, 30, and 32, as discussed in detail below. The second bearing surface 62 acts as a stop surface with respect to inwardly radial movement of the attachment component 58. Finally, the third bearing surface 63 of the carrier ring 36 serves as a reaction point for the actuator component 34.

The first and fourth bearing surfaces 60 and 64, respectively, are shaped and sized sufficiently to bear against the annular groove 38 as mentioned above. The segments which form the carrier ring 36 are arcuate in shape, thus giving the carrier ring 36 its annular configuration. The first and fourth bearing surfaces 60 and 64 are preferably smooth surfaces which extend the length of the arcuate segments of the carrier ring 36 generally concentric to one another. In this way, the first and fourth bearing surfaces 60 and 64 are capable of engaging the turbine diaphragm 14 along the length of the segments of the carrier ring 36. Of course, in an alternate embodiment, a plurality of the first and/or fourth bearing surfaces 60, 64 may be sparingly distributed in uniform or random fashion along the length of the packing ring 36 so as to sufficiently engage the turbine diaphragm 14 in order to effect retention of the carrier ring 36 within the annular groove 38.

The second and third bearing surfaces 62 and 63 may possess any shape and size sufficient to provide bearing surfaces with regard to the actuator component 34 and the attachment component 58 as alluded to above. In the illustrated embodiment, the surfaces 62 and 63 are continuous smooth generally circular surfaces which are arranged concentric with the aperture 56. Of course, in an alternate embodiment, a plurality of the first bearing surfaces 62 and 63 may be sparingly distributed in uniform or random fashion around the aperture 56 in order to effect the bearing and stopping properties with respect to the actuator component 34 and the attachment component 58 as mentioned above and as will be further described herein.

The attachment component 58 generally comprises a member which operatively connects the packing ring 21 and the carrier ring 36 in such manner as to allow radial movement of the packing ring 21 and/or the carrier ring 36 relative to one another. In the illustrated exemplary embodiment, the attachment member 58 includes an impeding component 70 and an extending component 72. The impeding component 70 is shaped and sized accordingly for disposition within the first portion 52 of the annular groove 38 so as to permit radial movement of the attachment component 58 to a certain tolerance and to impede movement beyond such tolerance. The impeding component 70 is configured to move radially inwardly and outwardly within the annular groove 38 with respect to the turbine diaphragm 14. This radial movement is limited in the inward direction by the second bearing surfaces 62 and in the outward direction by contact of the packing ring 21 with the further bearing surface 64 of the carrier ring 36. The extending component 72 extends centrally from the impeding component 70 and is configured to pass through the aperture 56 of the carrier ring 21. The extending component 72 is threaded at an end opposite from the impeding component 70. The aperture 56 includes a cross-sectional width which is slightly larger than that of the extending component 72 such that certain circumferential movement of the component 72 is permitted. The extending portion 72 is fixed to or formed integrally with the impeding portion 70 such that the extending portion is capable of the radial movement described above with reference to the carrier ring 36 and its related aperture 56.

In an exemplary embodiment, the attachment component 58 comprises a shoulder bolt where the impeding component 70 is a circular, disk-shaped element and the extending component 72 is a threaded cylindrical member formed integrally with and extending from the impeding member 70. The packing ring assembly 20 may further include a set screw 71 disposed in the packing ring segment 22 in contact with the extending component 72, as shown in FIG. 2, to further secure the component 72 to the segment 22.

The packing ring segments 22, 24, 26, 28, 30, and 32 are configured to receive and retain the extending component 72 of the attachment component 58. Particularly, the ring segments 22, 24, 26, 28, 30, and 32 include threaded receptacles 76 sized and shaped so as to threadingly engage and retain the treads of the extending component 72.

Of course this arrangement is merely illustrative. In another embodiment, the attachment component 58 is formed integrally with the packing ring segment 22 such that the extending component 72 integrally extends radially outward from the packing ring segment 22 through the aperture 56 to the interior of the carrier ring 36.

Further referring to FIG. 2, the actuator component 34 is disposed within the carrier ring 36 proximate to the aperture 56. At a first end 78, the actuator component 34 contacts the impeding component 70 of the attachment component 58. At an opposite second end 80, the actuator component 34 contacts the third bearing surface 63 of the carrier ring 36. In the exemplary embodiment as shown in FIG. 2, the actuator component 34 is a beehive or nested coil spring. In another embodiment, as shown in FIG. 3, the actuator component 34 is a traditional coil spring.

The configuration and disposition of the actuator component 34 biases the attachment component 58 radially outward and hence maintains the packing ring segment 22 (which is connected to the attachment component 58 via the extending component 72) in the open outermost large clearance position. This position allows a large clearance gap Y (see FIG. 1) between the rotary turbine shaft 12 and the sealing face 44 of the packing ring segment 22 when the rotary machine is in a transient condition. This "clearance" position is achieved by an outward radial force produced by the reaction of the actuator component 34 against the third bearing surfaces 63 where the radial force acts on the impeding component 70 of the attachment component 58 to urge the packing ring segment 22 into the clearance position. It should be appreciated that the actuator component 34 may be any actuating device, mechanism, or structure such as but not limited to at least one spring loaded bar, at least one cam, at least one hydraulic cylinder, at least one pneumatic device, at least one piezo-electric device, and at least one sinusoidal spring.

As shown in FIG. 2, the packing ring segment 22 is movable from the clearance position to the closed innermost small clearance sealed position, wherein a small clearance gap Z is provided between the turbine shaft 12 and the sealing face 44 of the packing ring segment 22. The packing ring segment 22 is moved into this "sealed" position when, during operation of the steam turbine 10, a fluid medium such as steam is inlet into the annular groove 38 of the stationary turbine diaphragm 14 from a high pressure source. The fluid medium builds a pressure upon the packing ring segment 22 and inwardly biases the segment 22 against the bias of the actuator component 34, thus moving the packing ring segment 22 towards the rotary turbine shaft 12, and reducing the clearance gap until a seal with the turbine shaft 12 is ultimately formed.

As shown in the drawings, the packing ring segment 22 is capable of radial movement over a distance X between the open large clearance position and the closed small clearance position. The distance X is delimited in the radially inward direction by the reaction of the impeding component 70 against the second bearing surface 62 of the carrier ring 36. The distance X is delimited in the radially outward direction by the reaction of the packing ring 21 against the fourth bearing surface 64 of the carrier ring 36. Advantageously, this distance X may be precisely controlled by varying the radial length of the extending component 72 and/or by varying the disposition of the second bearing surface 62 relative to the fourth bearing surface 64. For example, an extending component 72 having a greater radial length would allow more travel through the aperture 56 of the carrier ring 36 before contact is made between the packing ring 21 and the second or fourth surface 62, 64 of the carrier ring 36, thus increasing the distance X. Correspondingly, reducing the radial thickness of the extending component 72 would allow for less movement of the packing ring 21 relative to the carrier ring 36, thus lessening the distance X.

In one exemplary embodiment, the distance X is approximately 0.05 inches to 0.09 inches and is preferably 0.07 inches. The actuator component 34 is configured such that the packing ring assembly 20 is retained in the open large clearance position for pressures within the turbine 10 of less than approximately fifty pounds per square inch (psi). For pressures greater than approximately 50 psi, the attachment component 58 bears against and compresses the actuator component 34 to thus position the packing ring 21 in the closed small clearance position.

As shown in FIG. 1, each packing ring segment 22, 24, 26, 28, 30, and 32 employs two actuator components 34. The carrier ring 36 includes an aperture 56 for each actuator component 34. Thus, where the carrier ring 36 includes a plurality of segments which each correspond to one of the packing ring segments, the segments of the carrier ring 36 include two of the apertures 56, as is shown in FIG. 4. The packing ring assembly 20 may include fewer or more of the actuator components 34, as desired. For example, each segment 22, 24, 26, 28, 30, and 32 may utilize one, or three, or more of the actuator components 34. All of the segments 22, 24, 26, 28, 30, and 32 can include equal numbers of the actuator components 34 or variable numbers of the actuator components 34, as suited for a particular application of the invention.

Figure 5:
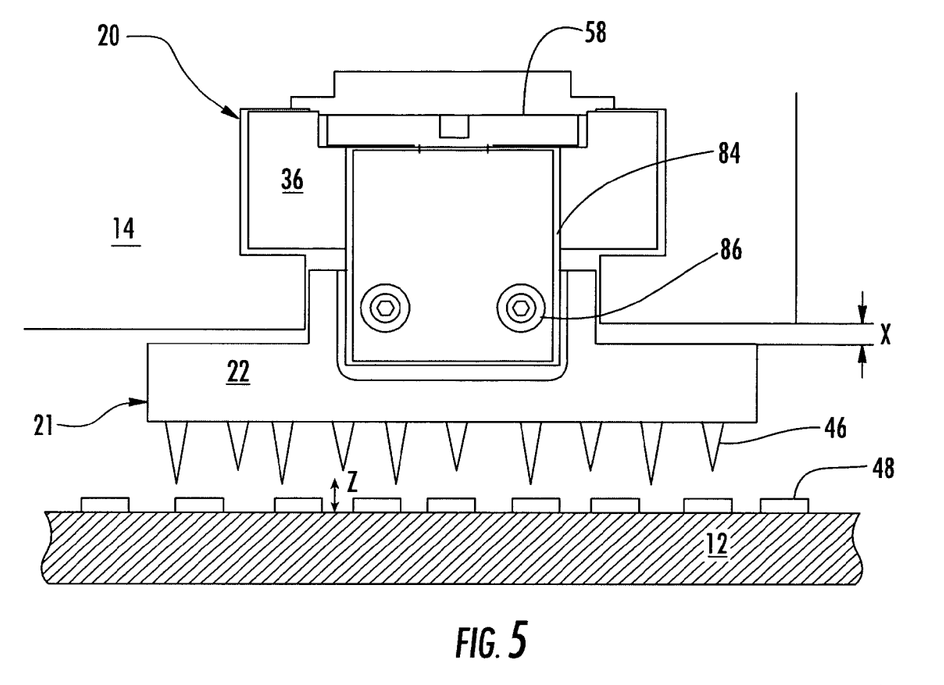
FIG. 5 is an enlarged section view of the exemplary steam turbine of FIG. 1 taken along axis B-B.
Figure 6:
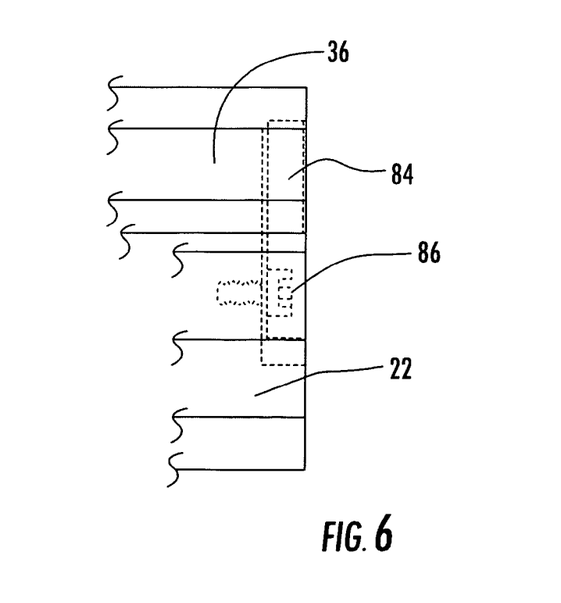
FIG. 6 is a partial side view of the steam turbine section of FIG. 5.

Referring to FIGS. 1 and 5-8, the packing ring assembly 20 further includes a retention member 84 at each of the horizontal joints 40 and 42. The retention member 84 is generally affixed at the horizontal joints 40 and 42 to the segments of the carrier ring 21 located in the lower second half 18 of the turbine diaphragm. Thus, in the exemplary embodiment, retention members 84 are affixed to ends of the packing ring segments 22 and 26 proximate to the respective horizontal joints 40 and 42. FIG. 5 is a cross-sectional view of the packing ring assembly 20 at the horizontal joint 40 taken along axis B-B. As shown, the retention member 84 extends radially outward from the packing ring segment 22. In this exemplary embodiment, the retention member 84 is connected to the packing ring segment 22 by bolts 86. Of course, this manner of fixation is purely illustrative. The retention member may be welded to the packing ring segment 22, formed integrally therewith, etc.

Figure 7:
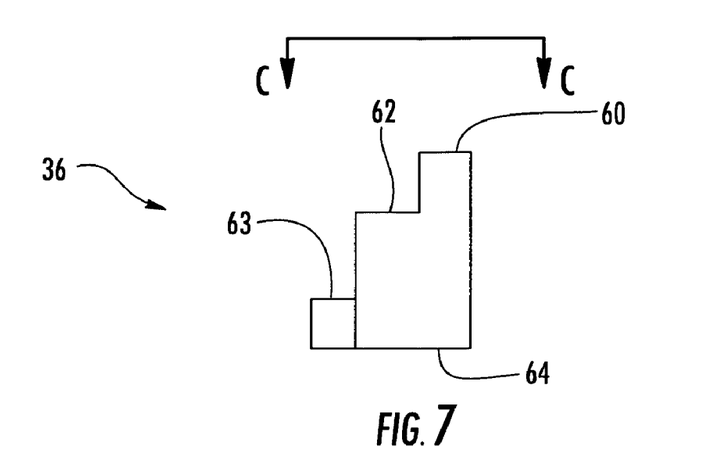
FIG. 7 is a front elevation view of one side of a carrier ring segment.
Figure 8:
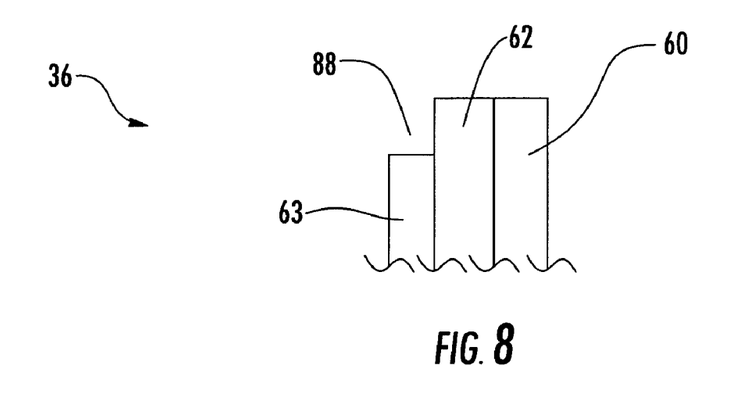
FIG. 8 is a partial plan view of the carrier ring segment of FIG. 7 taken from axis C-C.
Figure 9:
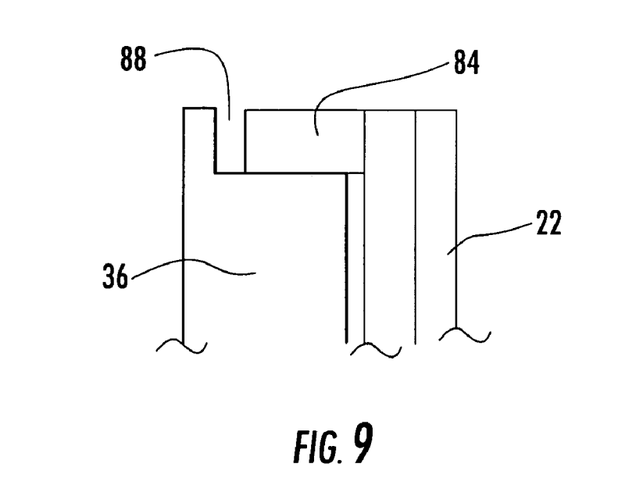
FIG. 9 is a side view of the carrier ring segment of FIG. 4.

The retaining member 84 serves to position and to maintain the position of the packing ring segment 22 relative to the carrier ring 36 in order to prevent an archbound condition. FIG. 7 shows an isolated view of one side of the carrier ring 36 of FIG. 2. FIG. 8 is a partial view of the side of the carrier ring 36 taken from axis C-C of FIG. 7. From this view, it is apparent that the portion of the carrier ring 36 which delimits the third bearing surface 63 is set back circumferentially relative to the portions of the carrier 36 which form the bearing surfaces 60 and 62. This set back arrangement delimits a recess 88 configured to receive the retaining member 84. That is, the retaining member 84 extends radially outward from the packing ring segment 22 and is received and retained in the recess 88 of the carrier ring 36, as best shown in FIGS. 4 and 9. In this way, the retaining member 84 secures the packing ring segment 22 on the corresponding segment of the carrier ring 36 and prevents circumferential movement of the former relative to the latter. That is, the retaining member 84 holds the packing ring segment 22 in a fixed circumferential position relative to the carrier ring segment and thus prevents gravity induced circumferential downward movement of the packing ring segment 22. This ensures that, during operation of the steam turbine 10, the packing ring segment 22 does not slip downward and ride over or under the adjacent packing ring segment 24 into an archbound position. Notably, the retention member 84 allows for radial movement of the packing ring segment 22 to allow for variable clearance of the packing ring 21 but yet inhibits circumferential movement of the segment 22.

Figure 10:
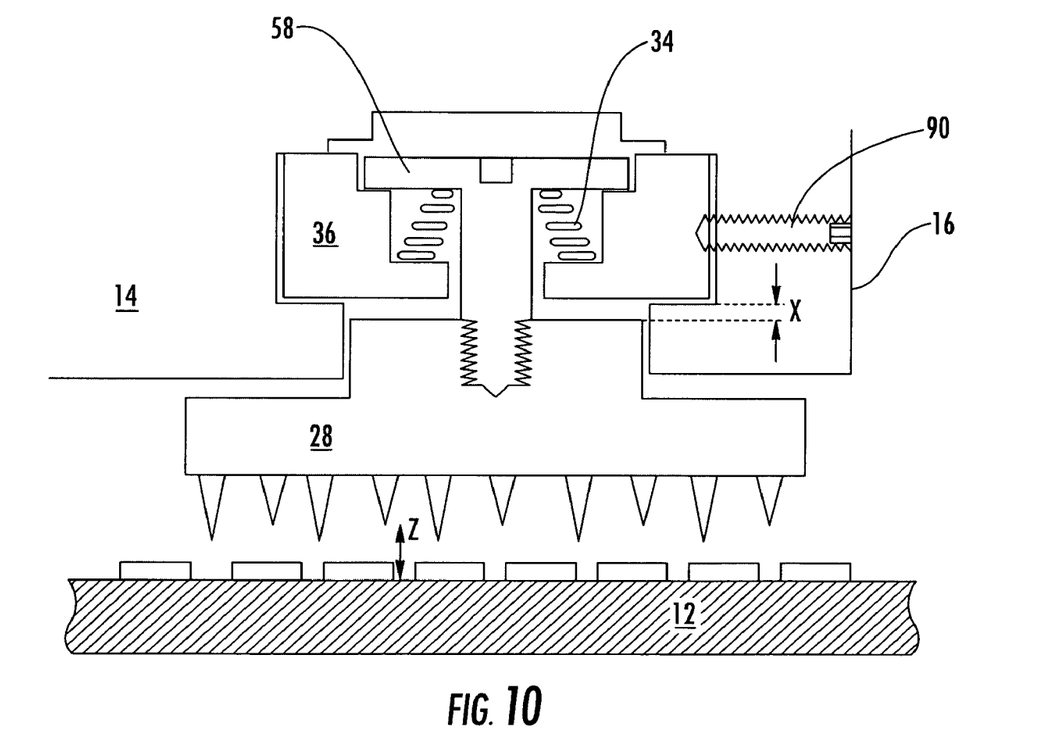
FIG. 10 is an enlarged section view of the exemplary steam turbine of FIG. 1 taken along axis D-D.
Figure 11:
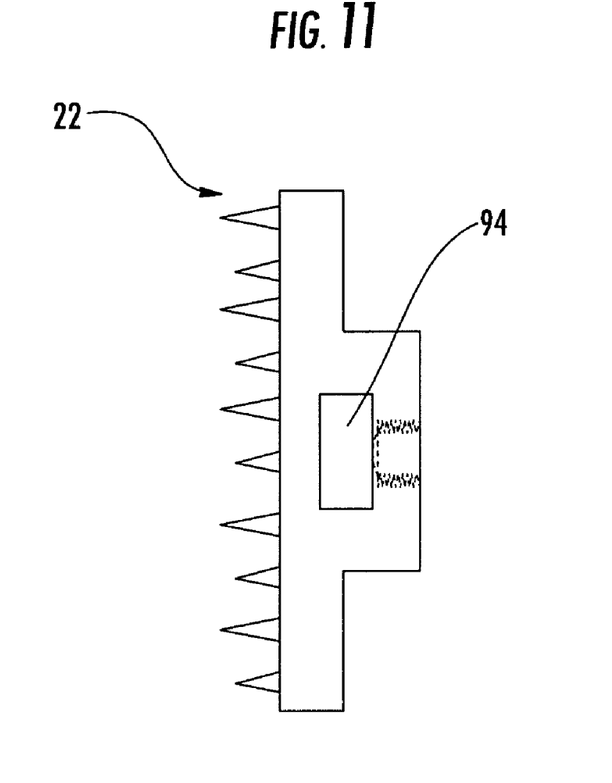
FIG. 11 is a front elevation view of a packing ring segment.
Figure 12:
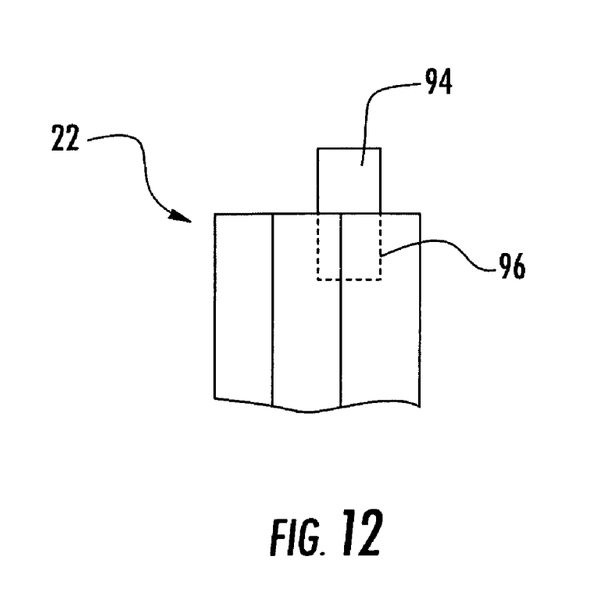
FIG. 12 is a partial side view of the packing ring segment of FIG. 11.
Figure 13:
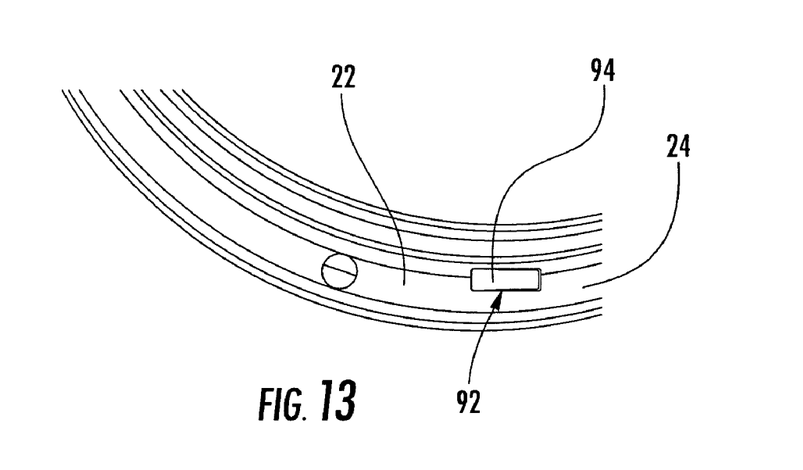
FIG. 13 is an enlarged partial view of a packing ring of the invention with a butt key.
Figure 14:
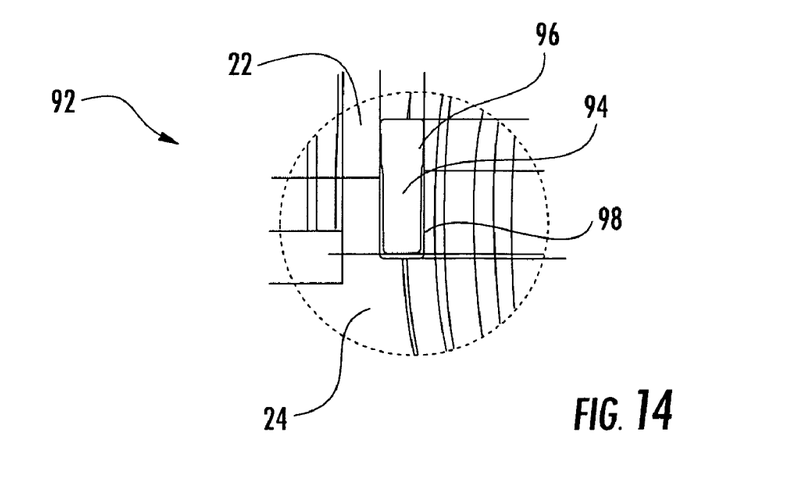
FIG. 14 is an enlarged portion of the packing ring of FIG. 13.

FIG. 10 shows a cross-sectional view of the carrier ring assembly 20 taken from the axis D-D of FIG. 1. That is, this view shows the packing ring segment 28 at the actuator component 34 proximate to the horizontal joint 42. In the upper first diaphragm half 16, archbinding is not a concern. Thus, the retention member 84 is not utilized on the segments 28 and 32. Here, a set screw 90 is used to retain the carrier within the annular groove 38 of the turbine diaphragm 14. This is particularly advantageous during initial fitting of the segments of the carrier ring 36 within the groove 38 in order to maintain the carrier segments in the upper half of the annular groove 38 during installation of the packing ring assembly 20.

Referring now to FIGS. 1 and 11-14, the packing ring assembly further includes an alignment arrangement 92 disposed between adjacent packing ring segments 22 and 24, segments 24 and 26, segments 28 and 30, and segments 30 and 32. That is, the alignment arrangement 92 is utilized between all packing ring segments except at the horizontal joints 40 and 42. Generally, the alignment arrangement 92 comprises an arrangement which provides for proper radial movement of the packing ring segments 22, 24, 26, 28, 30, and 32 but which does not allow undesirable misalignment thereof. In one exemplary embodiment, the alignment arrangement 92 comprises a key 94 which is fixed to and which extends circumferentially from one of a pair of adjacent packing ring segments. For example, as shown in FIGS. 11-14, the key 94 is fixed in the packing ring segment 22 and partially extending therefrom. Here, the key 94 may be disposed within in an aperture 96 of the segment 22 by a friction fit, via a set screw, by recessed weld, etc. Alternatively, the key 94 may be formed integrally with the segment 22. The portion of the key 94 extending from the packing ring segment 22 is received within an aperture 98 of the adjacent packing ring segment 24. The aperture 98 has a larger cross-sectional area than that of the extending portion of the key 94 such that the key 94 may move slightly within the aperture 98. This arrangement associates the ends of adjacent packing ring segments 22 and 24 in order to avoid archbinding thereof but yet permits desired radial movement of the segments 22 and 24 to provide for the pressure induced variable clearance positioning thereof.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A packing ring assembly comprising:
   an arcuate carrier ring segment having an aperture formed to extend through an entire radial length of a carrier ring;
   an arcuate packing ring segment movable relative to the carrier ring segment;
   an attachment component having an impeding portion operative to contact said carrier ring segment, connected to a cylindrical portion having a cylindrical outer surface perpendicular to said impeding portion disposed in said at least one aperture, said cylindrical portion having a threaded portion operative to engage said packing ring segment; and
   an actuator component including a spring member disposed concentrically about the cylindrical outer surface in contact with said impeding portion and said carrier ring segment operative to maintain the packing ring segment in a first position and to allow a movement of the packing ring segment to a second position when the packing ring assembly is exposed to a pressure condition.

2. The packing ring assembly of claim 1 wherein the first position is proximate to the carrier ring segment and wherein the second position is distal relative to the carrier ring segment.

3. The packing ring assembly of claim 1 wherein the pressure condition comprises an air pressure of greater than approximately fifty pounds per square inch in a region proximate to the packing ring segment.

4. The packing ring assembly of claim 1 wherein the actuator component is disposed within the carrier ring segment and in association with the attachment component.

5. The packing ring assembly of claim 4 wherein a first end of the attachment component is fixed to the packing ring segment and a second end of the attachment component is disposed movably within the carrier ring segment.

6. The packing ring assembly of claim 5 wherein the spring member comprises a spring having a first end configured to bear against the carrier ring segment and a second end configured to bias the attachment component radially outward to said maintain the packing ring segment in the first position.

7. The packing ring assembly of claim 1 wherein the carrier ring segment is an arcuate segment corresponding to the packing ring segment and wherein the carrier ring segment is disposed in a position radially outward relative to the packing ring segment.

8. The packing ring assembly of claim 7 wherein the carrier ring segment delimits an aperture and wherein the attachment component comprises a first extending component which passes through the aperture and engages the packing ring assembly.

9. The packing ring assembly of claim 8 wherein the impeding portion is movably disposed within the carrier ring segment which impedes movement of the attachment component relative to the aperture.

10. The packing ring assembly of claim 1 wherein the carrier ring segment comprises a plurality of individual carrier ring segments which delimit an annular carrier ring, wherein the packing ring segment comprises a plurality of individual packing ring segments which delimit an annular packing ring, and wherein the annular packing ring is disposed radially inward relative to the annular carrier ring.

11. The packing ring assembly of claim 10 wherein the plurality of packing ring segments comprises first, second, third, fourth, fifth, and sixth arcuate packing ring segments.

12. The packing ring segment of claim 10 further comprising:
   an alignment key fixed to a first of said packing ring segments and extending circumferentially therefrom; and
   an aperture formed in a second of said packing ring segments for receiving the key, the first packing ring segment disposed adjacent to the second packing ring segment;
   wherein the alignment key and the aperture are configured to allow radial movement of the first and second packing ring segments and to impede circumferential movement thereof.

13. The packing ring assembly of claim 1 wherein the annular carrier ring is configured to be received and retained within an annular groove having a dove-tail shaped cross-section.

14. The packing ring assembly of claim 1 wherein the annular packing ring is connected to the annular carrier ring by the attachment component and wherein actuator component is disposed so as to bias the attachment component in a radially outward direction to maintain the packing ring segment in the first position.

15. The packing ring assembly of claim 1 further comprising a retention member disposed in association with the arcuate carrier ring segment and in association with the arcuate packing ring segment to maintain a circumferential position of the packing ring segment relative to the carrier ring segment.

16. The packing ring segment of claim 15 wherein the retention member is fixed to the packing ring segment and extends radially therefrom and wherein the carrier ring segment includes a groove for receiving and retaining the retention member.

17. A steam turbine, comprising:
   a stationary turbine diaphragm;

a rotary turbine shaft disposed within the turbine diaphragm, the turbine diaphragm including an annular groove extending around the turbine shaft; and a packing ring assembly having a carrier ring disposed within the annular groove, said carrier ring including at least one aperture formed to extend through an entire radial length of said carrier ring;

a plurality of variable clearance arcuate packing ring segments disposed around the turbine shaft in a radially moveable association relative to the carrier ring;

an attachment component having an impeding portion operative to contact said carrier ring, connected to a cylindrical portion having a cylindrical outer surface perpendicular to said impeding portion disposed in said at least one aperture, said cylindrical portion having a threaded portion operative to engage at least one of said packing ring segments; and an actuator component including a spring member disposed concentrically about the cylindrical outer surface in contact with said impeding portion and said carrier ring operative to maintain the packing ring segment in a first position and to allow a movement of the packing ring segment to a second position when the packing ring assembly is exposed to a pressure condition.

18. The steam turbine of claim 17 wherein the pressure condition is between approximately forty and fifty pounds per square inch and wherein a distance between the first and second positions is approximately 0.050" to 0.090" inch.

19. A method of sealing a rotary machine with a positive pressure variable clearance packing ring assembly, the method comprising:

configuring a carrier ring to be received and retained in an annular groove of a stationary diaphragm of the rotary machine, said carrier ring having an aperture formed to extend through an entire radial length of said carrier ring;

disposing the carrier ring within the annular groove and around a rotary shaft of the rotary machine;

connecting a plurality of variable clearance packing ring segments to the carrier ring via a disposal of an attachment component having an impeding portion operative to contact said carrier ring connected to a cylindrical portion having a cylindrical outer surface perpendicular to said impeding portion disposed in said at least one aperture, said cylindrical portion, through the aperture and a fastening of said attachment component to said packing ring via a threaded portion of said cylindrical portion operative to engage at least one of said packing ring; and maintaining circumferential positions of the plurality of packing ring segments during radially movement of the plurality of packing ring segments with an actuator component including a spring member disposed concentrically about the cylindrical outer surface in contact with said impeding portion and said carrier ring.

* * * * *